United States Patent [19]

Chan

[11] Patent Number: 5,016,033
[45] Date of Patent: May 14, 1991

[54] SHUTTER MECHANISM FOR A CAMERA

[75] Inventor: Yet Chan, Kowloon, Hong Kong

[73] Assignee: Achiever Industries Ltd., Kowloon, Hong Kong

[21] Appl. No.: 416,495

[22] Filed: Oct. 3, 1989

[30] Foreign Application Priority Data

Oct. 4, 1988 [GB] United Kingdom ............... 8823260
Apr. 14, 1989 [GB] United Kingdom ............... 8908512

[51] Int. Cl.$^5$ .............................................. G03B 9/06
[52] U.S. Cl. .................................................. 354/251
[58] Field of Search .............. 354/226, 229, 250, 251, 354/254, 245, 248

[56] References Cited

U.S. PATENT DOCUMENTS

| 2,986,986 | 6/1961 | Eloranta | 354/229 |
| 3,446,132 | 5/1969 | Fauth | 354/254 |
| 3,709,135 | 1/1973 | Simon et al. | 354/251 X |
| 4,589,748 | 5/1986 | Ohmura | 354/250 X |
| 4,746,946 | 5/1988 | Chan | 354/250 |

Primary Examiner—Brian W. Brown
Attorney, Agent, or Firm—Christie, Parker & Hale

[57] ABSTRACT

A shutter-plate operating means for a camera is arranged for sliding and pivotal movement within a shutter housing and is spring-biased out of a cocked position, said operating means and a shutter plate being provided with interengageable cam surfaces, such that upon sliding movement of the operating means into a cocked position the cam surfaces will co-operate to cause the operating means to pivot to allow it to pass beyond the cam surface of the shutter plate, and such that upon release of the operating means from its cocked position, interengagement of the cam surfaces will cause the shutter plate momentarily to open a shutter aperture. Preferably the shutter plate operating means comprises a single, integrally formed shutter plate operating element which is generally planar, is arranged for sliding movement within the housing and includes the cam surface for operating the shutter plate, said cam surface being mounted on a resilient integral extension of said shutter plate operating element.

12 Claims, 4 Drawing Sheets

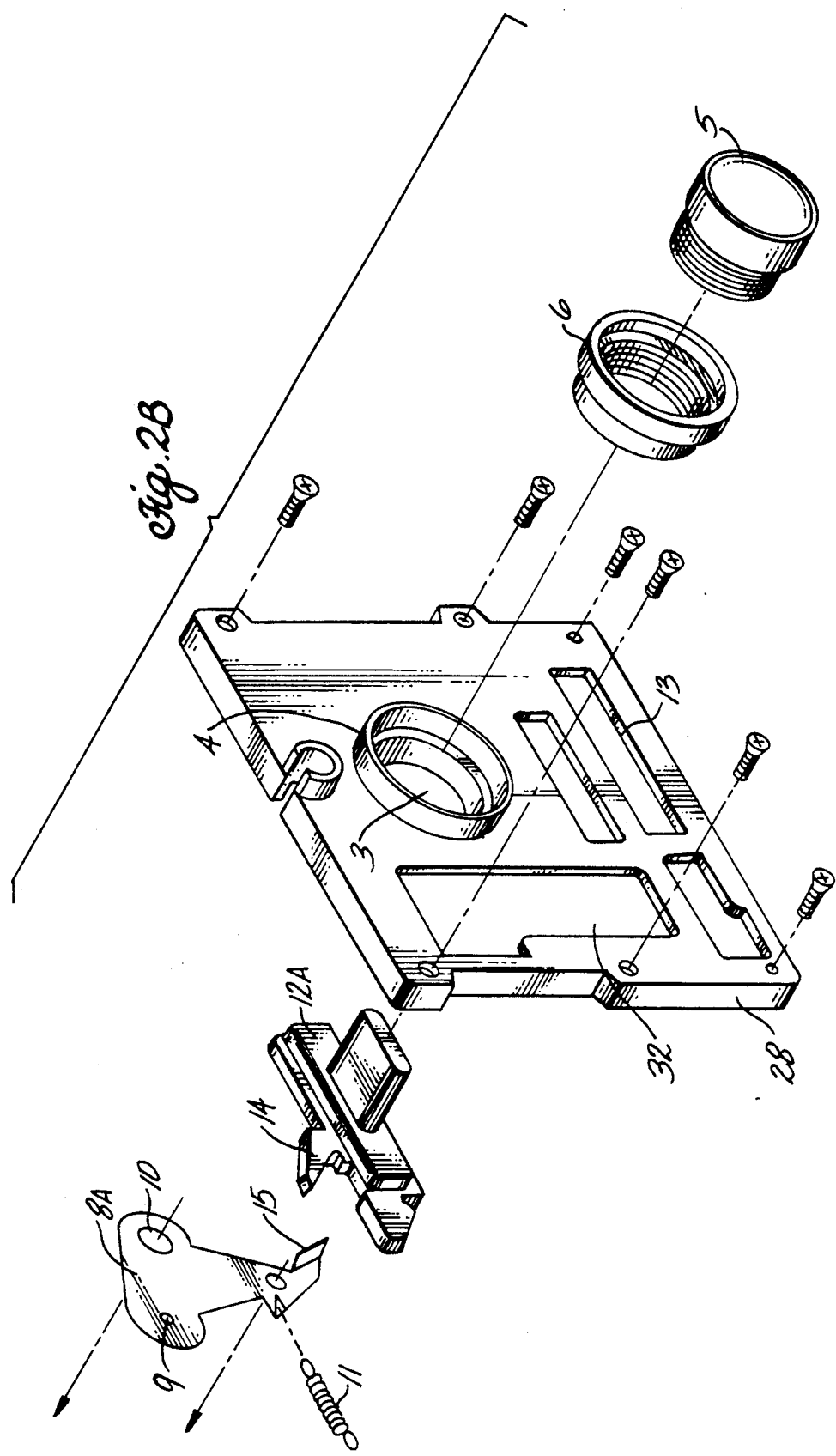

SHUTTER MECHANISM FOR A CAMERA

BACKGROUND OF THE INVENTION

This invention relates to a shutter mechanism for a camera and to a camera including such a mechanism.

SUMMARY OF THE INVENTION

According to a first aspect of the present invention there is provided a shutter mechanism for a camera, which mechanism comprises a shutter housing having an aperture; a shutter plate mounted for movement between a first position in which it closes the aperture and a second position in which it opens the aperture and spring-biassed into the closed position; shutter-plate operating means arranged for sliding and pivotal movement within the housing and spring-biassed out of a cocked position, said operating means and said shutter plate each being provided with interengageable cam surfaces, such that upon sliding movement of the operating means into a cocked position the cam surface of the operating means will co-operate with the cam surface of the shutter plate to cause a pivoting movement of the operating means to allow the operating means to pass beyond the cam surface of the shutter plate, and such that upon release of the operating means from its cocked position, interengagement of the respective cam surfaces will cause the shutter plate momentarily to open the aperture; and trigger means being provided to retain said operating means in its cocked position and to release it from its cocked position.

Preferably the shutter plate is pivotally mounted for movement between said first and second positions.

In one preferred embodiment, the shutter-plate operating means comprises a slidably moveable slide member and, pivotally secured thereto, a shutter-plate operating member, the cam surface of the operating means being provided upon said operating member.

In another preferred embodiment of the present invention, the shutter plate operating means comprises a single, integrally formed shutter plate operating element which is generally planar and is arranged for sliding movement within the shutter housing, the cam surface of said shutter plate operating means being mounted on a resilient integral extension of said shutter plate operating element.

In this further embodiment, the shutter plate operating element is preferably composed of a suitable plastics material.

The resiliency of the extension should be such as to permit pivoting movement of the cam surface essentially in the plane of the shutter plate operating element.

According to a further preferred embodiment of the present invention there is provided a shutter mechanism for a camera, which mechanism comprises a housing having an aperture, a shutter plate for pivotal movement within the housing momentarily to open the aperture, shutter operating means lying essentially in the same plane as the shutter plate and adapted for movement generally along a first axis between a cocked position and a rest position, and trigger means lying essentially in the same plane as the shutter plate and adapted for movement along a second axis generally at right angles to said first axis for allowing the shutter operating means to return from its first cocked position to its next position, thereby to cause the shutter plate momentarily to open the aperture in the shutter housing.

According to a still further preferred embodiment of the present invention there is provided a shutter mechanism for a camera, said shutter mechanism comprising a shutter housing which includes an aperture, a shutter plate, a shutter plate operating means and a trigger for permitting movement of the shutter plate operating means to operate the shutter so as momentarily to open the aperture, said shutter mechanism being unitary in construction and adapted for incorporation into a camera body, and for removal therefrom, as a single unit.

According to an even further preferred embodiment of the present invention there is provided a camera which incorporates a shutter mechanism in accordance with any one of the aspects thereof hereinbefore defined.

In a preferred embodiment the shutter mechanism of this invention incorporates means for altering the diameter of the aperture in the shutter housing. The shutter housing may also include means, e.g. a screw-threaded mount for receiving a lens.

BRIEF DESCRIPTION OF THE DRAWINGS

Embodiments of shutter mechanisms according to the present invention will now be described, by way of example only, by reference to the accompanying drawings, in which:

FIG. 2, comprising FIGS. 2a and 2b, is an exploded perspective view of the shutter mechanism of FIG. 1.

DETAILED DESCRIPTION

Figure 1:
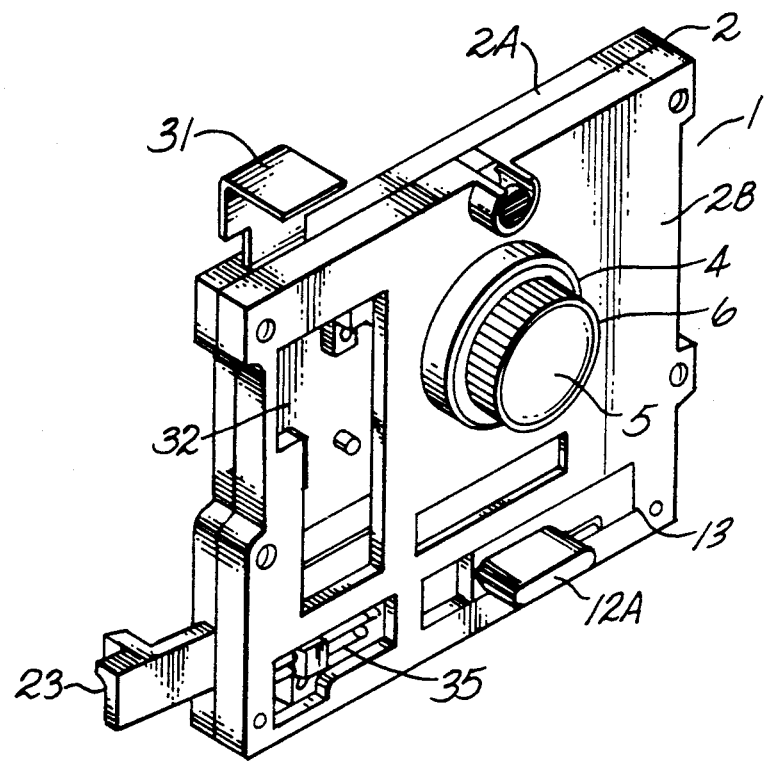
FIG. 1 is a diagrammatic perspective view of a first embodiment of a shutter mechanism according to the present invention.
Figure 2A:
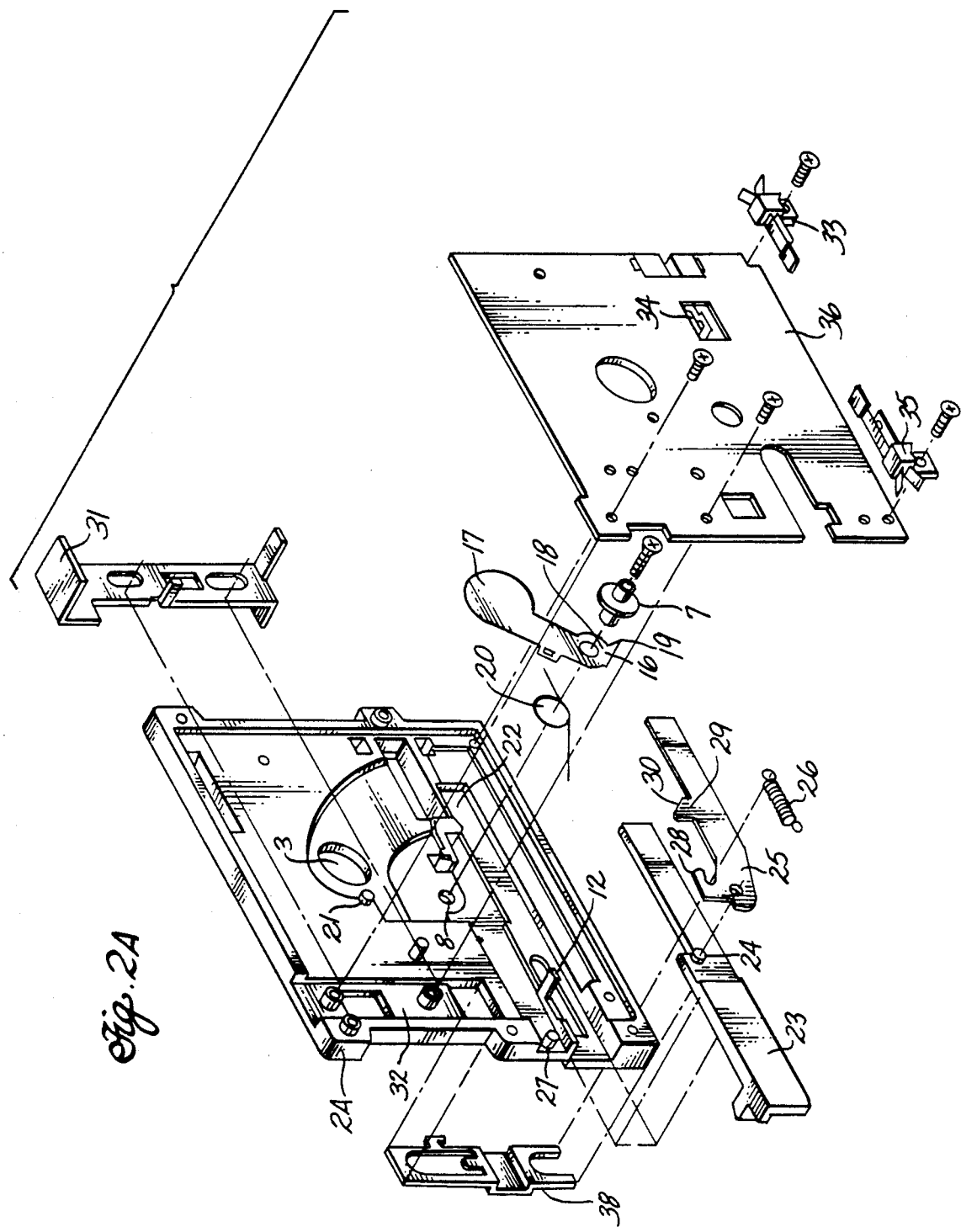

Referring to FIGS. 1 and 2 of the drawings, a shutter mechanism 1 includes a shutter housing 2 in two parts 2A, 2B. Each shutter housing part 2A, 2B defines an aperture 3 for allowing light to fall onto a photographic film of a camera (not shown). Part 2B of the shutter housing includes a screw-threaded lens mount 4 for receiving a lens 5 mounted in a lens barrel 6. A pivot pin 7 is located in a recess 8 of shutter housing part 2A.

Mounted for pivotal movement about pivot pin 7 is a diaphragm plate 8a provided with apertures 9, 10 of the different diameters, and moveable across the aperture 3 to regulate the amount of light to pass therethrough. The diaphragm plate 8a is spring-biassed by means of a spring 11 affixed at its other end to pin 12 on shutter housing part 2A. An aperture adjustment button 12A is arranged for slidable movement in slot 13 of shutter housing part 2B and includes a projection 14 arranged to co-act with abutment member 15 provided on diaphragm plate 8a to cause the diaphragm plate 8a to pivot.

Also mounted for pivotal movement about pivot pin 7 is a shutter plate 16. The shutter plate 16 includes a shutter portion 17 and a pawl device 18 including a cam surface 19. The shutter plate 16 is biased by means of a spring 20 into a position in which it closes the aperture 3 and abuts a shutter plate stop 21 provided on shutter housing part 2A.

Shutter housing part 2A defines a horizontal slide path 22 for a slide member 23. This slide member 23 bears a pivot pin 24 upon which is pivotally mounted a shutter plate operating member 25. A coil spring 26 acts between pin 27 on shutter housing part 2A and finger 28 provided on the shutter plate operating member 25 to bias the shutter plate operating member anti-clockwise as shown in the drawing. Shutter plate operating member 25 includes an upstanding pawl element 29 provided with a cam surface 30.

Sliding movement of the slide member 23 in a direction into the housing 2 causes cam surface 30 of shutter plate operating member 25 to bear upon cam surface 19 of shutter plate 16, thereby to impose upon shutter plate 16 a counter-clockwise torque. Since however shutter plate 16 is prevented from counter-clockwise movement by means of shutter plate stop 21, the shutter plate operating member 25 is itself moved clockwise until the pawl element 29 passes beyond pawl device 18, so as to engage therewith, and the shutter mechanism 1 is thus cocked.

A spring-biassed detent 38 serves to retain the slide member 23 in its inward position and thus the shutter mechanism 1 in its cocked condition.

A spring-biassed trigger 31, is arranged to move in a slide path 32 formed in shutter housing part 2A, generally at right angles to the sliding direction of slide member 23 and in generally the same plane as both shutter plate 16 and slide member 23. Operation of trigger 31 causes the detent 38 to release slide member 23. Thereupon, under the influence of spring 26, shutter plate operating member 25 and hence slide member 23 move in a direction outwardly of the shutter housing 2 along slide path 22. This return movement causes the pawl element 29, engaging the pawl device 18, momentarily to rotate shutter plate 16 in a clockwise direction thereby momentarily to open aperture 3. Subsequently, the shutter plate 16 returns to its rest position under the influence of spring 20 and slide member 23 returns to its initial position.

In use, with the shutter mechanism fitted into a camera body the slide member 23 would be arranged to be operated by a film transport or wind-on mechanism and thus the slide member serves not only as a shutter-cocking member but also as a means for preventing multiple exposure of a single photographic frame.

As may be seen from FIGS. 1 and 2 of the drawings, the shutter housing 2 includes a printed circuit board 36 provided with a seven way connector (not shown) for connection to a flash gun of the camera (not shown) and to illuminable indicator means (not shown). The shutter housing also supports reed switches 33, 34 and 35. Switch 33 is arranged to be closed by a first pressure upon trigger 31. Closing of switch 33 allows current to flow to a photo detector (not shown) for indicating to the user which aperture should be selected for the ambient light condition. Switch 34 is actuated by the aperture-opening movement of shutter plate 16 and acts to fire a flash gun of the camera. Switch 35 is made by aperture adjustment button 12 when the button 12 is in its extreme position with diaphragm plate 8a at maximum aperture. Only when switch 35 is made, i.e. only when the maximum aperture has been selected, can a said flash gun of the camera be fired. The making of switch 35 completes a charging circuit for a said flash gun.

In the foregoing embodiment, the shutter plate operating means consists of two separate elements, the first being arranged for sliding movement and the second being arranged for pivotal movement with respect to said first element, and the second element carrying cocking means in the form of a cam surface. The second element is mounted for pivotal movement on a peg extending from the first element and the second element is biassed into position be means of a coil spring extending between a finger on the second element and a pin on a shutter housing.

Figure 3:
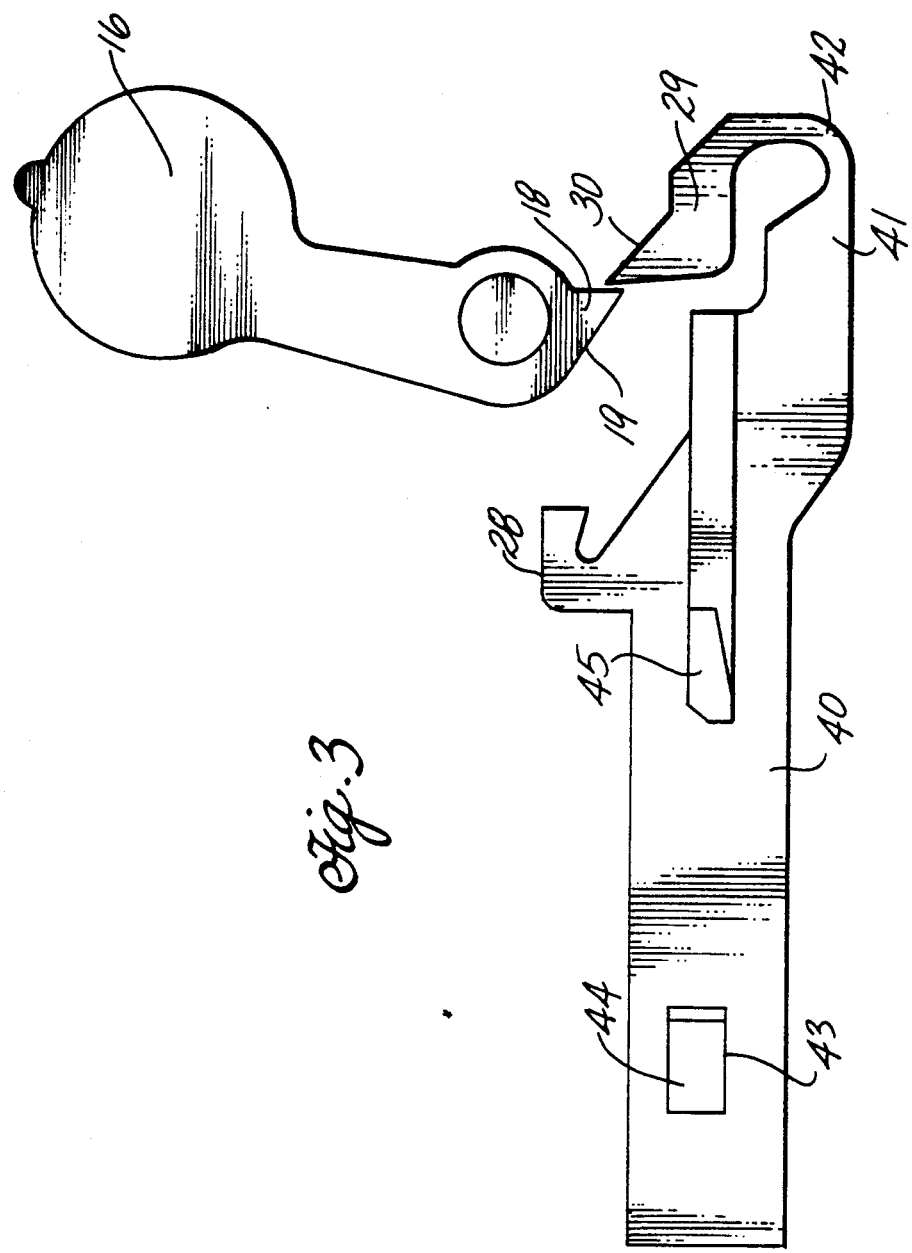
FIG. 3 is a side elevation of a second embodiment of a shutter plate operating member according to the present invention.

The embodiment of FIG. 3 represents an improvement of the shutter mechanism of FIGS. 1 and 2.

In FIG. 3 of the drawings there is shown a second embodiment of the present invention, in the form of a shutter plate operating member 40 of plastic material. There is also shown a shutter plate 16. The shutter plate operating member 40 is generally planar and replaces the shutter plate operating elements 23 and 25 of FIGS. 1 and 2. The shutter plate operating member 40 includes a finger 28 for carrying one end of a coil spring (not shown) for biassing the member 40 to the left as shown in FIG. 3. At a distal end 41 of member 40 there is provided an integral resilient extension 42 lying in the plane of member 40. Carried on the end of extension 42 is an upstanding pawl element 29 provided with a cam surface 30.

In like manner to the embodiment of FIGS. 1 and 2 pawl element 29 is deflected downwardly by co-action between cam surfaces 19 and 30 when the shutter plate operating member 40 moves to the right as shown in FIG. 3, i.e. to a cocking position. On pressing a trigger (not shown), the shutter plate operating member returns to the left as shown in the drawing thereby causing pawl 29 momentarily to engage with pawl 18 and so to cause shutter plate 16 momentarily to rotate in a clockwise direction to open a camera shutter aperture.

The shutter plate operating member 40 includes a number of lateral projections which may be formed integrally therewith or secured thereto. One said projection 43 is provided with a cam surface 44 for actuation (i.e. cocking of the member 40) by a suitable actuator means e.g. in the form of a film-winding knob (not shown). Another said projection 45 acts as a detent for co-acting with a trigger (not shown) arranged for sliding movement generally at right angles to the sliding direction of shutter plate operating member 40.

In this embodiment of the invention, the spacing between projection 43 and projection 45 is such that the shutter plate operating member 40 is moved into a cocked position [i.e. in which detent 45 passes beyond a trigger detent (not shown)] before movement of shutter plate operating member 40 to the right (i.e. in a cocking direction) is arrested by projection 43 striking housing part 2A. This provides a camera with a better "feel" when the camera is used, because it allows the mechanism some "give".

By means of the present invention there is provided a shutter mechanism for a camera, which mechanism can be modular for convenience of camera assembly or disassembly and which need occupy relatively little space within the camera. Moreover, the shutter mechanism of the present invention is simple and robust, yet effective.

What is claimed is:

1. A shutter mechanism for a camera, which mechanism comprises a shutter housing having an aperture; a shutter plate mounted for movement between a first position in which it closes the aperture and a second position in which it opens the aperture and spring-biassed into the closed position; shutter-plate operating means arranged for sliding and pivotal movement with respect to the housing and spring-biassed out of a cocked position, said operating means and said shutter plate each being provided with interengageable cam surfaces, such that upon sliding movement of the operating means into a cocked position the cam surface of the operating means will co-operate with the cam surface of the shutter plate to cause a pivoting movement of the operating means to allow the operating means to pass beyond the cam surface of the shutter plate, and such that upon release of the operating means from its cocked position, interengagement of the respective cam surfaces will cause the shutter plate momentarily to open the aperture; and trigger means being provided to retain said operating means in its cocked position and to release it from its cocked position.

2. A mechanism according to claim 1, wherein the shutter plate is pivotally mounted for movement between said first and second positions.

3. A mechanism according to claim 1 or 2, wherein the shutter-plate operating means comprises a slidably moveable slide member and pivotally secured thereto a shutter-plate operating member, the cam surface of the operating means being provided upon said operating member.

4. A mechanism according to claim 1 or 2, wherein the shutter plate operating means comprises a single, integrally formed shutter plate operating element which is generally planar and is arranged for sliding movement within the shutter housing, the cam surface of the shutter plate operating means being mounted on a resilient integral extension of said shutter plate operating element.

5. A mechanism according to claim 4 wherein the shutter plate operating means is composed of plastics material.

6. A mechanism according to claim 4, wherein the shutter plate operating means includes a transverse projection to act as a detent for co-acting with a trigger mechanism.

7. A mechanism according to claim 4, wherein the shutter plate operating means includes a first transverse projection to act as a cam surface whereby, in use, the shutter plate operating means can be urged into a cocked position.

8. A mechanism according to claim 7, wherein the shutter plate operating means includes a second transverse projection spaced apart from the first transverse projection to act as a detent for co-acting with a trigger mechanism, and the spacing between said first and second projections of said shutter plate operating means is selected so that co-action of the detent with a trigger mechanism will occur before the shutter plate operating means reaches its cocked position.

9. A mechanism according to claim 1 comprising means for altering the diameter of the aperture in the shutter housing.

10. A mechanism according to claim 1 comprising switch means operable to open or close an electrical circuit.

11. A camera comprising a shutter mechanism, said shutter mechanism comprising a shutter housing having an aperture; a shutter plate mounted for movement between a first position in which it closes the aperture and a second position in which it opens the aperture and spring-biassed into the closed position; shutter-plate operating means arranged for sliding and pivotal movement with respect to the housing and spring-biassed out of a cocked position, said operating means and said shutter plate each being provided with interengageable cam surfaces, such that upon sliding movement of the operating means into a cocked position the cam surface of the operating means will co-operate with the cam surface of the shutter plate to cause a pivoting movement of the operating means to allow the operating means to pass beyond the cam surface of the shutter plate, and such that upon release of the operating means from its cocked position, interengagement of the respective cam surfaces will cause the shutter plate momentarily to open the aperture; and trigger means being provided to retain said operating means in its cocked position and to release it from its cocked position.

12. A camera according to claim 11, wherein the shutter plate operating means is arranged to be moved to its cocked position upon winding on or advance of a film within the camera.

* * * * *